March 31, 1931.  M. OKOCHI  1,798,349
APPARATUS FOR AERATED OIL INJECTION FOR INTERNAL COMBUSTION ENGINES
Filed June 14, 1927   3 Sheets-Sheet 1
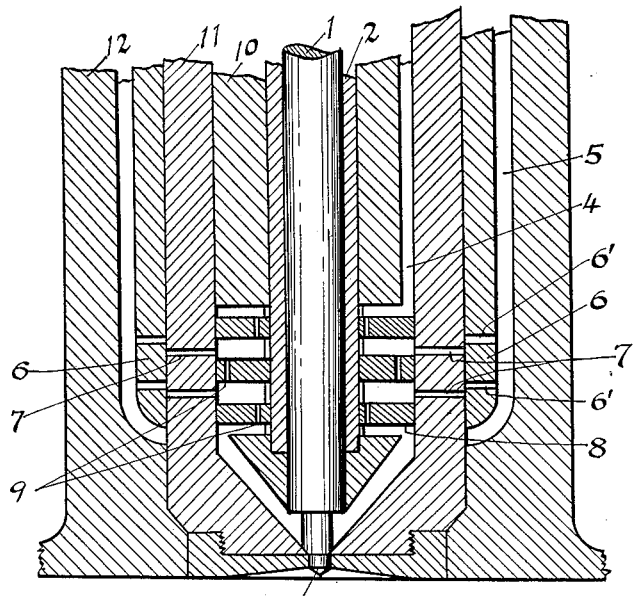
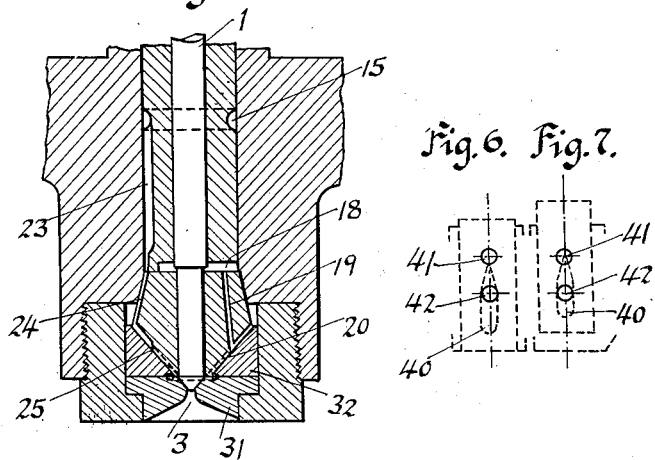
Inventor:
M. Okochi
By Attorneys: Marks & Clerk

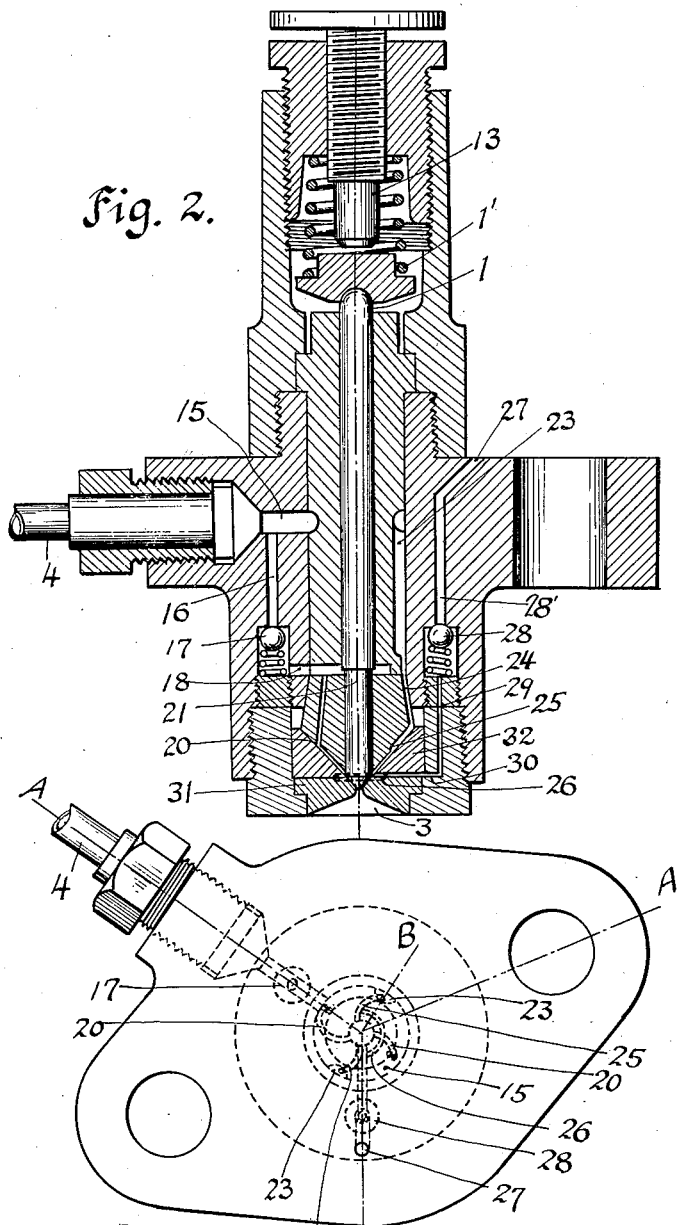

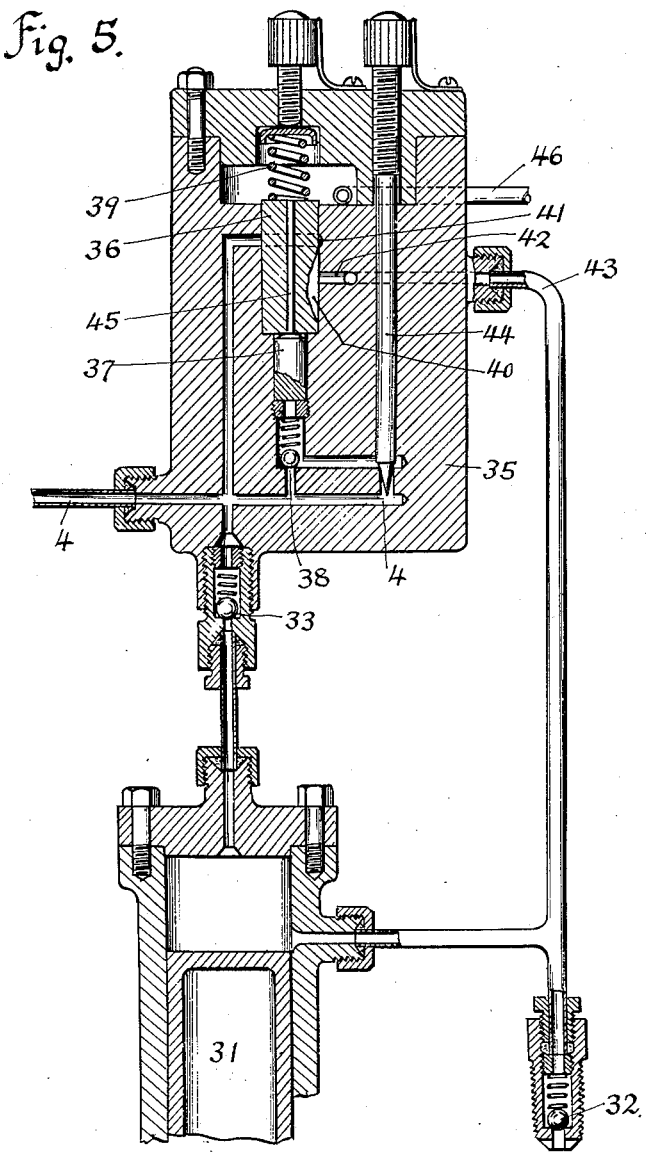

Patented Mar. 31, 1931

1,798,349

UNITED STATES PATENT OFFICE

MASATOSI OKOCHI, OF SHITAYA-KU, TOKYO, JAPAN, ASSIGNOR TO ZAIDAN HOJIN RIKAGAKU KENKYUJO, OF TOKYO, JAPAN

APPARATUS FOR AERATED-OIL INJECTION FOR INTERNAL-COMBUSTION ENGINES

Application filed June 14, 1927, Serial No. 198,857, and in Japan January 14, 1926.

This invention relates to an apparatus for injecting fuel oil for an internal combustion engine. The object of the invention is to propose a new system for oil injection whereby fuel oil can be very minutely pulverized to easily make an instant ignition even without using very high oil pressure.

According to this invention, fuel oil, which is to be injected under pressure, is mixed with air or other gas just before it is injected so that when the mixture is injected into an engine cylinder, the oil particles are very minutely pulverized by the sudden expansion of air or other gas to form perfect oil fog and thus an instant perfect ignition of the fuel can be achieved.

In an engine of ordinary Diesel type, high pressure compressed air is used for medium of injecting and pulverizing fuel oil which therefore accompanied some troubles for producing so high compressed air. In an engine of so called solid or airless injection type, an oil pressure over 300 atmospheric pressure must be employed in order to minutely pulverized oil particles to enable an instantaneous ignition. Even under such high pressure, oil particles are hardly sufficiently pulverized and accordingly the time spent for ignition is prolonged. Therefore, although the efficiency of an engine is better the speed is smaller, it is a matter of great difficulty to obtain a good efficiency in a high speed engine of solid injection type and many sacrifices are necessitated therefor. The present invention concerns neither the injection process of ordinary compressed air type in which compressed air is the only medium of injecting oil, nor to the so called solid injection in which the oil is injected by its own high pressure. Thus the invention is a new system of oil injection which may be named aerated oil injection and in which although the motive force of injection is obtained by the oil pressure, this is not necessary to be so high as in the solid injection and the pulverizing action of fuel oil is mainly obtained by the expansion of air or other gas which is preparedly mixed with the oil just before the injection. As in this invention air or other gas is not the medium of injecting oil, its pressure before aeration may be only atmospheric. But it is conveniently more or less compressed for the purpose of aerating it in fuel oil.

In the accompanying drawings:

Fig. 1 shows one example of the injection device for carrying out the new process, in section;

Fig. 2 shows another example of the injection device for carrying out the new process, in section along line A—A of Fig. 3;

Fig. 3 is a plan view of lower side thereof;

Fig. 4 is a detailed view of a part thereof, in section along line B—B of Fig. 3;

Fig. 5 shows a form of an oil pump appartus suitable for aerating fuel oil for carrying out the invention, in section;

Figs. 6 and 7 are detailed front elevations of a part, in different positions, employed in the pump apparatus shown in Fig. 5.

In Fig. 1, 1 is a spindle valve of known type slidably arranged in a sleeve 2 fitted to an outer sleeve 10 and is pressed against the valve seat by means of a spring, not shown, to shut an injection nozzle 3. 4 is a fuel chamber which is directly connected to a fuel pump, not shown. This pump is provided with a non-return valve in its suction side while there is no such provision in its delivery side. Therefore, when the piston of said pump begins its suction stroke, a part of the fuel filled in the chamber 4 counterflows towards the fuel pump, and thereby a part of air or other gas in an air or other gas chamber 5 inside the casing 12 rushes into the fuel chamber 4 forming small bubbles through openings 6' of a cylindrical valve 6 and small passages 7 provided in a fixed member 11, the latter forming the body of the injection device. The air or other gas bubbles sucked into the chamber 4 are prevented from floating upon the upper layer of the fuel oil by means of a series of perforated circular diaphragms 8 or wire nets etc. The cylindrical valve 6 is arranged to be slidable along the fixed body 11 in the example shown and its operation is so regulated by means of a cam or other convenient transmission device operated by the driving shaft of the fuel pump that the volume of air or other gas sucked into the chamber 4 as well as the period of suction can be adjusted. Thus, when a predetermined volume of air or other gas is sucked into the chamber 4 at predetermined period, the cylindrical valve 6 cuts off connection between the air or other gas chamber 5 and the oil chamber 4, so that the oil pump sucks the fuel oil into its cylinder thereafter. When the piston of the oil pump begins its delivery stroke, the pressure of oil in the oil chamber 4 is raised and thereby the air or other gas bubbles contained therein are compressed, a part of the oil having here a tendency of flowing towards the nozzle 3 through perforations 9 provided in the diaphragms 8. The spindle valve 1, however, is not yet opened because it is pressed against the valve seat by means of a spring, not shown, of sufficiently large pressure. When air pressure in the engine cylinder almost reaches to the maximum, and accordingly oil pressure in the oil chamber 4 reaches to a certain predetermined pressure, say, 90 atmospheric pressures, the spindle valve 1 is firstly raised and the fuel containing air or other gas bubbles is jet into the engine cylinder through the nozzle 3. As the pressure of air or other gas bubbles contained in fuel oil is far greater than that of air pressure in the engine cylinder, say 30 atmospheric pressures, they make sudden expansion when jet into the cylinder and thereby pulverize the oil particles into smallest size possible so that the oil easily makes instantaneous complete combustion.

In the second example shown in Figs. 2 to 4, 1 is a spindle valve which is pressed against its valve seat by means of a strong spring 1' and its lift is adjusted by a screw 13. 4 is a supply tube of fuel oil which is supplied by a high pressure oil pump of convenient form, one example of which will be described hereinafter. The fuel oil coming from the tube 4 passes through oil ducts 15 and 16 and opens a non-return valve 17. It further passes through a space 18 encircling the needle valve 1, ducts 19 and finally reaches to conical oil ducts 20. When pressure of oil is raised to a predetermined pressure, the needle valve 1 is lifted from its valve seat by oil pressure acting to the shoulder 21 of the valve 1 so that the nozzle 3 is opened to let oil injected into the engine cylinder. When oil pressure decreases at the end of the delivery stroke of the oil pump, the valve 1 is again pressed against its valve seat by the spring 1' and closes the nozzle 3. When the oil pump begins its suction stroke, oil contained in the oil tube 4 counterflows towards the pump as the pump is provided with no non-return valve in the delivery side. Oil contained in the space 18, the duct 19 and the conical duct 20 is prevented from counterflowing by the non-return valve 17. The oil is aerated while it is reciprocated in the spaces 18, 16, 15 and 4, the air being here filled in the space from 29 to 18 through the two spiral grooves 25 directly communicating to 18. As the oil contained in the duct 15 counterflows towards the pump, oil contained in ducts 23, 24 also counterflows and therefore there is created vacuum in conical ducts 25. The lowest end of each of the ducts 25 is communicated with a semi-circular groove 26, through which the ducts 25 are communicated to atmosphere or other gas space. Therefore, atmospheric air or other gas rushes into the conical grooves 25 through a duct 27, 28' a non-return valve 28 now opened, ducts 29, 30, and the circular groove 26. If, the volume of this air or gas is ample, the ducts 23, 24 may also be filled with the air or gas. When the oil pump begins its delivery stroke, the non-return valve 28 is closed and the air or gas preparatory sucked into therein is greatly compressed and at the instant when oil pressure in the duct 18 is sufficiently raised to lift the valve 1 from its valve seat, oil is ejected from the conical ducts 20, while air or gas under the same pressure is ejected from the conical ducts 25 so that they are intermixed by their spiral motion in the valve seat or about and finally sprayed into the engine cylinder in form of complete fog.

Of course, the above mentioned fuel pump may be of any convenient type. For instance, this pump is only of high pressure delivery and air or other gas may be compressed by an independent pump and this air or gas may be supplied to the ducts 23 by cutting off the communication between the ducts 15 and 23. In such case, the semi-circular groove 26 and the ducts 29, 30 can be omitted. In Figs. 5, 6, 7, however, a type of the oil pump roughly described with reference to the second example, is fully illustrated as one example thereof.

In these drawings, an oil pump 31 sucks fuel oil into its cylinder in the suction stroke from an oil tank, not shown, through a non-return valve 32 and delivers the oil into the injection device through a non-return valve 33 and the oil supply tube 4 aforesaid. 35 is the body of an automatic regulating valve which is provided with a cylindrical valve 36 and an ordinary plunger 37. When the piston of the pump begins its delivery stroke and thereby oil pressure of the injection device is raised, a non-return valve 38 below the plunger 37 is lifted and the cylindrical valve 36, which is held in place between the plunger 37 and a spring 39, is lifted against the action of the spring. The cylindrical valve 36 is provided with a recess 40 the front view of which is shown in Figs. 6 and 7. When the cylindrical valve 36 is in a position shown in Fig. 5, the communication between a duct 41 and the recess 40 is cut off. When, however, the cylindrical valve 36 is lifted against the action of the spring 39, the duct 41 and another duct 42 are communicated by a leak area which is equal to a part of the recess 40 falling in the circle of the duct 41 as shown in Fig. 7. Therefore, the parts are in such a condition as to let oil be supplied to the injection device both through the non-return valve 33 directly and through a by-pass pipe 43 communicating to the duct 42, the recess 40 and the duct 41. When the cylindrical valve 36 is lifted to further extent, the leak area of the recess 40 is increased, viz., the leak area increases as compression of the spring 39 does. When the pump begins its suction stroke after oil injection is finished, the non-return valves 33 and 38 are shut and the cylindrical valve 36 will act to press down the plunger 37 by the action of the spring 39. If, however, a suitable throttle valve, for instance, a spindle valve 44 is pressed against its valve seat, the cylindrical valve 36 can not come down and therefore the oil pump will suck oil not only from the oil tank, not shown, but also from the spraying devices through the duct 41, the recess 40, the duct 42 and the by-pass pipe 42. Therefore air or other gases will in turn be sucked into the injection device as already described with reference to the second example of the apparatus and the volume of such air or other gas is of course equal to the volume of oil contained in the spraying device and sucked into the pump as above stated. If, however, the spindle valve 44 is slightly lifted from its valve seat, the cylindrical valve 36 gradually comes down by the action of the spring 39 and finally cut off the communication between 41 and 40. Therefore, by adjusting the position of the spindle valve 44, the volume of air or other gas sucked into the spraying device can be adjusted.

In the event of air or other gas bubbles being accumulated in the injection device so that oil pressure can not be sufficiently raised, the cylindrical valve 36 can not compress the spring 39 sufficiently, and accordingly the leak area of the recess 40 is not sufficiently large as shown in Fig. 7. Moreover, the communication between 41 and 40 is comparatively rapidly cut off. Therefore, the volume of air or other gas sucked into the injection device becomes remarkably small so that the volume is automatically adjusted by means of the spring 39. If the accumulation of air or other gas in the spraying device is so large that the oil pressure does not reach to the predetermined valve, the cylindrical valve 36 is not lifted entirely so that no volume of air or other gas is sucked into the injection device in the suction stroke of the pump which therefore sucks oil only from the oil tank. Thus, the volume of oil supplied to the injection device is remarkably increased and the oil pressure is soon raised to recover normal working condition of the apparatus.

The cylindrical valve 36 and the plunger 37 may be made in two separate bodies for the convenience of manufacture, although they may be built in one piece. It is also convenient to provide a small duct 45 in the valve 36 for escape of the leaked oil which will be returned to the oil tank through a pipe 46.

Claims:

1. In a fuel injection mechanism, a casing, a valve, a valve seat in said casing, a shoulder on said valve seat, means for normally pressing said valve against said valve seat, means for adjusting said valve seat, an oil supply conduit in said casing, a plurality of conical oil ducts in said casing surrounding said valve and communicating with the opening in said valve seat and said supply conduit, a recess in said casing surrounding the shoulder of said valve seat and in communication with said supply conduit and said conical oil ducts, an air duct in said casing, a one way valve in said air duct, said casing having a semi-circular groove near the valve seat communicating with the lower extremities, some of said conical ducts and said air duct whereby when oil is forced into said recess in said casing surrounding said valve, said valve is lifted and oil is ejected from some of said conical ducts and gas from the remaining conical ducts, effecting an intermixing of the oil and gas by their spiral motion about the valve seat.

2. In a fuel injection system having a fuel injection device as set forth in claim 1, an oil pump adapted to communicate with an oil supply, an automatic oil regulating device communicating with said pump and the supply conduit of said injection mechanism, a one-way valve in the communicating conduit between said oil pump and said regulating device, said regulating device comprising a casing, a by-pass duct in said casing communicating with said supply conduit and the oil pump, a cylindrical valve in said casing, a plunger for actuating said cylindrical valve, said cylindrical valve forming upon a predetermined movement a communication between the oil pump and said by-pass duct, a one-way valve disposed in the communicating means communicating with said circular valve and the oil pump, said valve having a recess therein and adapted upon movement to a predetermined position to communicate with said by-pass duct and a by-pass pipe of said oil pump, and a throttle valve for regulating the opening of said valve.

In testimony whereof I affix my signature.

MASATOSI OKOCHI.